(12) United States Patent
Bonner

(10) Patent No.: US 6,550,427 B2
(45) Date of Patent: Apr. 22, 2003

(54) TOY OR SHELTER FOR SMALL ANIMALS

(75) Inventor: R. Alan Bonner, Frenchtown, NJ (US)

(73) Assignee: Holton Ind. t/a Bio-Serv, Frenchtown, NJ (US)

( * ) Notice: Subject to any disclaimer, the term of this patent is extended or adjusted under 35 U.S.C. 154(b) by 0 days.

(21) Appl. No.: 10/005,502

(22) Filed: Dec. 7, 2001

(65) Prior Publication Data

US 2002/0179019 A1 Dec. 5, 2002

Related U.S. Application Data

(63) Continuation-in-part of application No. 09/873,992, filed on Jun. 4, 2001.

(51) Int. Cl.⁷ .............................. A01K 29/00
(52) U.S. Cl. ...................... 119/707; 119/452
(58) Field of Search ............... 119/702, 707, 119/482, 452; D30/108; 446/268

(56) References Cited

U.S. PATENT DOCUMENTS

| 2,246,965 | A | * | 6/1941 | Yoder | 119/707 |
| D214,928 | S | | 8/1969 | Swett | |
| 4,803,953 | A | * | 2/1989 | Graves | 119/707 |
| 5,525,152 | A | * | 6/1996 | Roschger et al. | 106/493 |
| 5,564,369 | A | * | 10/1996 | Barber et al. | 119/221 |
| 5,896,829 | A | * | 4/1999 | Rothenberg et al. | 119/417 |
| 5,921,204 | A | * | 7/1999 | Johnson | 119/416 |
| D414,903 | S | | 10/1999 | Baiera | |
| D420,471 | S | * | 2/2000 | French | D30/108 |
| 6,253,712 | B1 | * | 7/2001 | Johnson | 119/452 |

OTHER PUBLICATIONS

Bio–Serv Product Showcase (Mouse Igloo) Jolly Pets, Inc catolog #394 Fun Balls.

* cited by examiner

Primary Examiner—Charles T. Jordan
Assistant Examiner—Judith A. Nelson

(57) ABSTRACT

A durable animal toy or shelter comprising:
an enclosure having at least one opening for ingress and egress of an animal, and a floor,
wherein the toy or shelter is transparent, can be autoclaved, and inhibits light penetration is disclosed.

3 Claims, 1 Drawing Sheet

TOY OR SHELTER FOR SMALL ANIMALS

CROSS-REFERENCE TO RELATED APPLICATION

Figure 1:
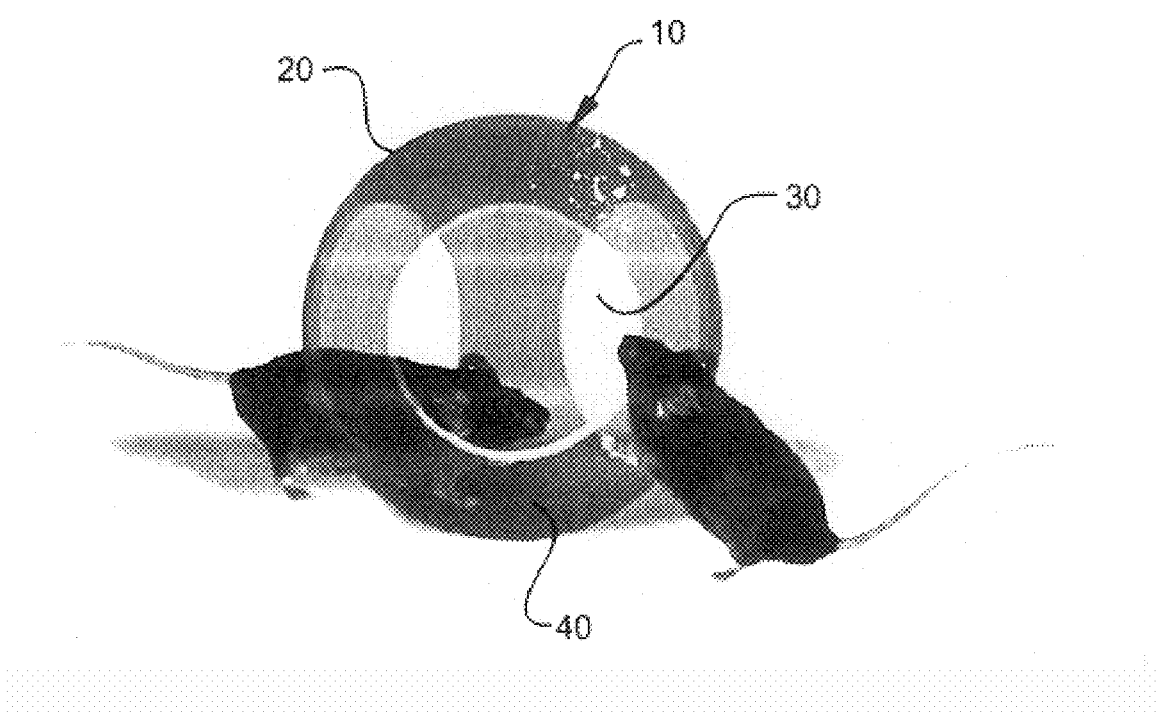

This Application is a continuation-in-part application of U.S. application Ser. No. 09/873,992 filed on Jun. 4, 2001, which is incorporated herein by reference in its entirety.

FIELD OF THE INVENTION

This invention relates to a toy or shelter for small animals. The toy or shelter is made of a material that can be autoclaved. The toy or shelter is transparent which enables scientists to observe animals while the animals are within the toy or shelter. A colorant is added to or coated on the material that the toy or shelter is made from. The colorant inhibits light penetration so that the toy or shelter has appropriate lighting conditions for the animals.

BACKGROUND OF THE INVENTION

Many people maintain small animals as pets or for scientific purposes. As used herein, small animals include, but are not limited to, mice, rats, and hamsters. There are many commercially available homes for small animal pets. The homes are typically made of a transparent thermoplastic material, such as polypropylene. Some of the thermoplastics are tinted with a colorant such as yellow dye. The homes may be various shapes, and frequently have tubes that connect different areas of the homes.

Various toys have been developed to entertain small animals or enrich their environments. For example, the JOLLY BALL™ is commercially available through Jolly Pets Inc. of Ravenna, Ohio. The JOLLY BALL™ is a round, opaque, polyethylene object that contains holes for ingress and egress of small animals. Small animals can crawl into and out of the JOLLY BALL™. They can also roll around inside the JOLLY BALL.

Many scientists observe small animals at various times, such as while the animals are playing, sleeping, or breeding. For this purpose, it would be useful to have a toy or shelter that is transparent. Although a transparent toy or shelter would enable observation of the animal, the transparency would also enable an excessive amount of light to penetrate into the toy or shelter. This may be undesirable, as animals' habits are frequently affected by light.

Small animals frequently have sharp teeth and enjoy gnawing on objects. Small animal toys and shelters that are commercially available may be made from plastics that are soft enough for small animals to chew. This is undesirable, as ingested plastic may adversely affect the animal, or studies performed with the animal. As used herein, materials that can not be chewed by a small animal are durable.

It is often desirable for small animals to avoid contact with their feces or urine. This occurs most frequently with immunodeficient animals as they move in contact with soiled bedding in the cage. Therefore there is a need for a small animal toy or shelter to provide the opportunity, similar to a floor, that allows the animal to get off the soiled bedding.

People who maintain animals frequently clean the animals' toys. For pet owners, cleaning usually entails wiping the toys with a cleaning solution. Scientists may prefer to autoclave their animal toys to reduce the likelihood of the animal getting sick. Autoclaves utilize high temperature and pressure to kill microorganisms. It would be useful if an animal toy was made of a material that could be autoclaved.

Therefore, there is a need for an animal toy or shelter that is transparent, yet inhibits light penetration into the toy, is durable, and can be autoclaved.

SUMMARY OF THE INVENTION

The present invention provides a durable animal toy or shelter having an enclosure including at least one opening for ingress and egress of an animal, and a floor, wherein the toy is transparent, can be autoclaved, and inhibits light penetration.

DETAILED DESCRIPTION OF THE INVENTION

The animal toy or shelter is made of a polymeric material that is transparent, durable, and can be autoclaved. Suitable polymeric materials include polyolefins, such as, but not limited to, high molecular weight polyethylene, ultra high molecular weight polyethylene, and polypropylene; polyphenylsulphone; styrene; acrylates and methacrylates, such as, but not limited to, methyl acrylate, methyl methacrylate, ethyl acrylate, ethyl methacrylate, butyl acrylate, butyl methacrylate, and the like; polyamides, such as, but not limited to, nylon 6, nylon 6,6, nylon 12, nylon 101, and the like; polycarbonate; combinations thereof; and copolymers thereof. Polycarbonate is preferred. The polymeric material may be provided in solid form, such as a sheet or a powder, or in liquid form, depending on the desired process for manufacturing the shelter.

A colorant is added to the polymeric material, or coated onto the polymeric material the shelter is made from in order to inhibit light from getting into the toy. Suitable colorants do not change the transparency of the polymeric material when combined with the polymeric material. Such colorants include, but are not limited to, red, burgundy, pink, orange, yellow, amber, green, blue, turquoise, violet, and purple. Red and amber are preferred. The colorants are commercially available as, for example, FD & C Red and the like.

When the colorants are to be combined with the polymeric materials, the colorants should be soluble in the polymeric materials. The amount of colorant utilized will vary, but is sufficient to inhibit light penetration into the toy, yet provide a transparent shelter. Generally, the amount of colorant ranges from about 0.001 percent by weight to about 10 percent by weight, based on the total weight of the material making up the toy.

When the colorant is placed onto the toy or shelter, the colorant generally is contained in a plastic film or is in liquid form. The amount of colorant utilized in the plastic film or liquid will vary, but is sufficient to inhibit light penetration into the toy or shelter, yet provide a transparent toy or shelter. Plastic films containing colorants may be placed onto the shelter or toy by methods known in the art, such as the use of an adhesive to adhere the plastic film to the toy or shelter, shrink wrapping the plastic film onto the toy or shelter, or using heat to fuse the plastic film with the toy or shelter. Liquid colorants may be applied by methods known in the art, such as spray coating, dip coating, and brush coating.

The shape of the toy or shelter is not critical. Suitable shapes include squares, rectangles, triangles, pyramids, cones, spheres, hexagons, and diamonds. Spheres are preferred. The size of the toy or shelter is sufficient to house at least one small animal, preferably multiple small animals. In a round structure, the diameter of the toy typically ranges from about 5 cm to about 15 cm, preferably from about 7.5 cm to about 12.5 cm. The height of the toy or shelter typically ranges from about 5 cm to about 15 cm, preferably from about 7.5 cm to about 12.5 cm.

The toy or shelter contains a floor. The floor may be flat or spherical. When the floor is spherical, a toy is formed, such that the animal can roll around in the toy, or roll the toy itself.

The toy or shelter contains at least one opening for ingress and egress of animals. Multiple openings may be useful, for example 2, 3, 4, 5, or 6 openings may be utilized. The toy or shelter preferably contains 3 openings. The shape of the openings is not critical. Suitable shapes include, but are not limited to, circles, ellipses, squares, rectangles, triangles, and stars. The size of the openings is sufficient to enable the ingress and egress of the small animals. Generally, the height of the opening may range from about 2.5 cm to about 10 cm, preferably from about 4 cm to about 7.5 cm.

The toys or shelters may be made by processes known in the art. One suitable process is injection molding, where plastic material is melted and injected into a mold in the shape of the toy or shelter, then cooled. Another suitable process is thermoforming plastic sheet, where a plastic sheet is melted and molded into the suitable shape, then the openings are cut or stamped. Vacuum forming is another useful process where plastic sheet is heated and drawn by vacuum into the suitable shape, then cooled. The openings are then cut or stamped into the toy or shelter.

The toy or shelter may be formed in two halves that are permanently attached to each other in a separate step. For example, the halves may be combined into the desired shape and ultrasonically welded. Commercially available adhesives may also be useful to permanently attach the halves. Other suitable means of attachment include, but are not limited to, snap fits, thread fits, and tongue and groove fits.

DRAWINGS

FIG. 1 is a perspective view of an animal toy or shelter of the present invention. Animal toy or shelter 10 includes an enclosure 20 having openings 30 and a floor 40.

Several examples are set forth below to further illustrate the nature of the invention and the manner of carrying it out. However, the invention should not be considered as being limited to the details thereof.

EXAMPLE 1

LEXAN® brand polycarbonate is mixed with 0.01 percent by weight red dye based on the total weight of the mixture and melted. A two cavity mold in the shape of two half-spheres with 3 half spherical openings equidistant along the perimeter or mid-line of the mold is provided. The mold is injected with the melted mixture. The mixture is cooled and released from the mold. The two half-spheres are sonically welded to form a sphere. The small animal toy has the following dimensions: internal height of 10.0 cm, diameter of 10.0 cm, and 3 spherical hole openings of 6.5 cm.

EXAMPLE 2

UDEL R® brand polyphenylsuofone is mixed with 0.01 percent by weight red dye based on the total weight of the mixture and melted. A two cavity mold in the shape of a square, with two holes, is injected with the melted mixture. The mixture is cold and released from the mold. The two halves (mirror images) are fixed together utilizing a commercially available adhesive. The small animal toy has the following dimensions: internal height 10.0 cm, width 10.0 cm, length 10.0 cm, and hole size of 6.5 cm.

EXAMPLE 3

LEXAN 4504® polycarbonate is mixed with 0.01 percent by weight amber dye based on the total weight of the mixture and melted. A two cavity mold in the shape of a rectangle with 4 holes placed in the sides is injected with the melted mixture. The mixture is cooled and released from the mold. The mirrored halves have the following dimensions: 12.0 cm in length, 8.0 cm in width, and 10.0 cm in height.

What is claimed:

1. A durable animal toy or shelter comprising:
    an enclosure in a shape selected from the group consisting of a square, a rectangle, a triangle, a pyramid, a cone, a sphere, a cylinder, a hexagon, a tepee, and a diamond;
    said enclosure having at least one opening for ingress and egress of an animal, and a floor;
    wherein the toy can be autoclaved, and contains from about 0.001 percent by weight to about 1 percent by weigh of a colorant to inhibit light penetration, but provide a transparent toy.
2. The small animal toy or shelter according to claim 1 wherein the toy or shelter is formed in two halves that are permanently attached to each other in a separate step.
3. The small animal toy or shelter according to claim 2 wherein the permanent attachment is obtained through an ultrasonic weld.

* * * * *